Patented Mar. 3, 1936

2,032,347

UNITED STATES PATENT OFFICE 2,032,347

PROCESS OF MANUFACTURING PORTLAND CEMENT

Louis A. Dahl and Wilson C. Hanna, Colton, Calif., assignors to California Portland Cement Company, Los Angeles, Calif., a corporation of California No Drawing. Application March 14, 1933, Serial No. 660,648

8 Claims. (Cl. 106—25)

This invention has reference to the manufacture of Portland cement, and has for its object the production of an improved quick-hardening Portland cement possessing high tensile and compressive strength. Certain aspects of the present process, to wit, the method of making high-iron Portland cement raw mixtures, are broadly covered in our copending application on Process of preparing Portland cement raw mixtures, Ser. No. 660,646, filed on even date herewith.

In order that the invention may be most clearly understood and certain expressions appearing through the description and in the appended claims, clearly defined, the description of the process will be prefaced with a few remarks pertaining to the composition and constituents of Portland cement.

Portland cement clinker is manufactured by calcining to incipient fusion an intimate mixture of materials, the said mixture being composed of lime (CaO) silica ($SiO_2$) and alumina ($Al_2O_3$) as essential components, and in addition other components, such as iron oxide and magnesia, commonly associated with the essential components in the natural deposits of raw materials commonly used, the said mixture further being within a range of compositions to be hereinafter described.

In the calcination of a mixture capable of forming Portland cement clinker, chemical changes occur which involve the volatilization of components which are volatile at the temperature attained in the process of calcination, and the combination of the components which remain to form various compounds which give to the clinker its property of forming Portland cement when ground with or without gypsum or any other regulator of rate of setting, and which will hereinafter be referred to as Portland cement compounds. All of the compounds which may be formed are not known but it is commonly believed at the present day that tricalcium silicate, $3CaO.SiO_2$, dicalcium silicate, $2CaO.SiO_2$, tricalcium aluminate, $3CaO.Al_2O_3$, and tetracalcium alumino-ferrite, $4CaO.Al_2O_3Fe_2O_3$, are the principal compounds of lime which may appear in crystalline form, and that magnesia, MgO, appears in the form of crystalline MgO. In addition to the oxides required to form the above-named compounds Portland cement clinker may also contain minor components, such as titania, manganese and the alkalies, which are usually present in such small amounts that they are generally disregarded in considering questions pertaining to the proportioning of raw materials.

In considering the influence of variations in composition upon the temperature and time required for satisfactory calcination, and upon other problems of manufacture, and also upon the characteristics of the finished product, it is convenient to express the composition of clinker in terms of the above-named compounds, obtaining their respective percentages by computation from the oxide composition determined by chemical analysis. In the case of mixtures of raw materials prepared for calcining to produce Portland cement clinker it is also convenient to express their compositions in terms of the above-named compounds, notwithstanding the fact that it is known that none of the said compounds are present in the raw material. Since it is not to be implied that the composition expressed in terms of these compounds represents the actual percentages of such compounds which are present, the calculated compound composition will hereinafter be referred to as potential composition. The percentage of any compound in the potential composition will be referred to as the potential percentage of that compound. For instance, the calculated percentage of $3CaO.SiO_2$ will be referred to as the potential percentage of $3CaO.SiO_2$ or, more briefly, as potential $3CaO.SiO_2$. It should be understood that the potential composition of uncalcined mixtures of raw materials is always determined after calculating the oxide composition to an ignited basis, in order to substantially represent the potential composition which will be had after calcination.

Portland cement clinker varies widely in potential composition, depending upon the composition of the raw materials used and the proportions of such raw materials which are necessary for obtaining a cement of desired hydraulic properties. Although the range of compositions of Portland cement clinker cannot be defined accurately, it may be said that $3CaO.SiO_2$ and $2CaO.SiO_2$ comprise the greater portion of the potential composition. The sum of these two compounds is usually between 72 and 76 per cent, although some Portland cement clinkers may contain over 80 per cent of these two compounds. It is possible that some Portland cements may be made with less than 70 per cent of these two compounds. The magnesia, MgO, may vary from nearly zero to about 5 per cent. $3CaO.Al_2O_3$ and $4CaO.Al_2O_3.Fe_2O_3$ comprise substantially all of the remainder of the potential composition. The relative proportions of potential $3CaO.Al_2O_3$ and potential $4CaO.Al_2O_3$ depend upon the relative proportions of $Fe_2O_3$ and $Al_2O_3$ in the oxide composition of the clinker, and is usually governed by the relative proportions of these oxides in the argillaceous material available to the manufacturer. The potential percentage of $3CaO.Al_2O_3$ is usually between 6 and 14 per cent. The potential percentage of $4CaO.Al_2O_3.Fe_2O_3$ is usually between 5 and 15 per cent.

It should be understood that a mixture of raw materials containing components of Portland cement clinker is not a Portland cement raw mixture unless the raw materials therein are so proportioned that upon being calcined the mixture will form a Portland cement clinker. Any mixture of materials which may be calcined to make Portland cement clinker will be hereinafter referred to as a cement raw mixture or cement raw mix.

Tricalcium silicate, $3CaO.SiO_2$, is the compound in cement which is generally believed to be responsible for high early strength. Although any calcareous and argillaceous materials such as are commonly used in Portland cement manufacture may be proportioned in such a manner as to secure a higher potential $3CaO.SiO_2$ than the usual percentage in Portland cement, such raw mixtures cannot be calcined satisfactorily in a single operation. Various methods of producing quick-hardening cement have been proposed, such methods generally requiring a second calcination of cement clinker after adjusting the composition to obtain a maximum potential $3CaO.SiO_2$, or requiring the calcination of a mixture of a Portland cement clinker with a cement raw mix.

It has been found that by grinding cement clinker with a small percentage of a ferruginous mixture to be described later, calcining and clinkering the resulting mixture at or slightly above the temperature of incipient fusion, and then grinding this final clinker with or without gypsum, or any other regulator of rate of setting to form Portland cement, the cement so obtained possesses the property of attaining its strength more rapidly than normal Portland cement of the same composition. The reason for this result is not fully established, but our theoretical studies indicate that at the comparatively low temperatures employed the liquid portion of the clinker is high in alumina, iron oxide and other components capable of combining with lime, and that in the solid portion the percentage of lime available for combination with silica is thereby increased sufficiently to cause the formation of more actual $3CaO.SiO_2$ than is indicated in the potential composition. Ordinarily the temperatures required to calcine cement raw mixtures satisfactorily in the usual process are too far above the temperature of incipient fusion to obtain this condition.

The ferruginous mixture which is added has been found to assist in securing the desired condition by increasing the percentage of liquid formed when the clinker is re-calcined. The ferruginous mixture consists principally of iron oxide, with such silica, alumina and other components as may be present as minor constituents or impurities.

In making the ferruginous mixture, sufficient calcareous material is added to a ferruginous material so that when the potential composition of the mixture is calculated on the assumption that the iron oxide, alumina and silica are combined with lime to form the compounds $CaO.Fe_2O_3$, $3CaO.Al_2O_3$, $3CaO.SiO_2$, and $2CaO.SiO_2$, the ratio of potential $3CaO.SiO_2$ to potential $2CaO.SiO_2$ is the same as a selected or predetermined ratio of $3CaO.SiO_2$ to $2CaO.SiO_2$ desired in the Portland cement clinker. For instance, if the ordinary Portland cement clinker is intended to have a $3CaO.SiO_2/2CaO.SiO_2$ ratio of 2.00, the composition of the ferruginous mixture is so adjusted that it also has a $3CaO.SiO_2/2CaO.SiO_2$ ratio of 2.00. The ferruginous mixture may be made without any substantial amount of silica present by adding calcareous material to a ferruginous material in such proportion that there is theoretically just sufficient CaO in the mixture to combine with the $Fe_2O_3$ to form $CaO.Fe_2O_3$ and to combine with any $Al_2O_3$ which may be present to form $3CaO.Al_2O_3$. In this case there is no adjustment of $3CaO.SiO_2/2CaO.SiO_2$ ratio possible, since these compounds are not present in the potential composition. When such a ferruginous mixture, containing no silica, is added to a cement raw mix, the $3CaO.SiO_2/2CaO.SiO_2$ ratio is not altered in any case. For instance, if a ferruginous mixture containing no silica is added to a cement raw mix in which the $3CaO.SiO_2/2CaO.SiO_2$ ratio is 3.00, the said ratio in the final mixture will be 3.00. This condition is obtained by virtue of the fact that the potential $3CaO.Al_2O_3$ merely adds to the $3CaO.Al_2O_3$ already present, and the potential $CaO.Fe_2O_3$ furnishes CaO and $Fe_2O_3$ in the molecular proportions required to unite with $3CaO.Al_2O_3$ to form $4CaO.Al_2O_3.Fe_2O_3$, without any components remaining to react with $3CaO.SiO_2$ or $2CaO.SiO_2$.

It should be understood that the ferruginous mixture is not a cement raw mix, and that the assumption that it is composed of the above-named compounds is merely a mathematical device employed for the purpose of computing the proportion of calcareous material to be added to counteract the decrease in the potential $3CaO.SiO_2/2CaO.SiO_2$ ratio which will occur if $Fe_2O_3$, $Al_2O_3$ or $SiO_2$ are added to a cement raw mix. This mathematical device is required because the ferruginous mixture is not a cement raw mix, and its potential composition consequently cannot be computed in terms of the Portland cement compounds previously named.

In a ferruginous mixture the ratio of $Fe_2O_3$ to $Al_2O_3$ is greater than in the Portland cement compound $4CaO.Al_2O_3.Fe_2O_3$. It is consequently impossible to calculate the potential composition of such a mixture if it is assumed that the CaO, $Al_2O_3$, $Fe_2O_3$ and $SiO_2$ combine to form the Portland cement compounds $3CaO.SiO_2$, $2CaO.SiO_2$, $4CaO.Al_2O_3.Fe_2O_3$ and $3CaO.Al_2O_3$. That is, it is impossible to calculate the potential composition in the same manner as with Portland cement, or even to proceed to a point which will provide the values necessary for designating a $$3CaO.SiO_2/2CaO.SiO_2$$

ratio for the mixture. Since such a ratio cannot be designated for a ferruginous material by the methods commonly used for Portland cement raw mixtures, it has not previously been known that it is possible to compound a single ferruginous mixture which can be added to a series of Portland cement raw mixtures of a given $$3CaO.SiO_2/2CaO.SiO_2$$

ratio, but differing otherwise in composition, without altering said ratio in any case. We have discovered, however, that if the $Fe_2O_3$ in a ferruginous mix is assumed to combine with CaO to form a hypothetical compound $CaO.Fe_2O_3$, instead of combining with CaO and Al₂O₃ to form the Portland cement compound $$4CaO.Al_2O_3.Fe_2O_3,$$

it is possible to calculate the potential composition of the ferruginous mixture, and to designate a $3CaO.SiO_2/2CaO.SiO_2$ ratio for said mixture.

In carrying out the process, we first form a cement raw mix in which the composition is so controlled that the ratio of potential $3CaO.SiO_2$ to potential $2CaO.SiO_2$ in the clinker obtained by calcining said raw mix will have a desired value. The cement raw mix is then calcined in the usual process of producing Portland cement clinker. The clinker so produced may be used exclusively for the production of quick-hardening Portland cement, or it may be divided into two parts, one part being ground with or without gypsum, or any other regulator of rate of setting, to produce normal Portland cement. The other part is ground, after the addition of a ferruginous mixture, then calcined at a temperature at or only slightly above the temperature of incipient fusion, and the resulting clinker finally ground with gypsum or any other regulator of time of setting to form quick-hardening Portland cement.

We prefer to add the ferruginous mixture to the normal Portland cement clinker in such proportion that the ferric oxide content of the clinker produced by our process will be 1.0 per cent higher than in the normal Portland cement clinker. We may, however, add the ferruginous mixture to the normal Portland cement clinker in proportions depending upon the composition of the normal Portland cement clinker, in order to maintain a substantially constant ferric oxide content in the quick-hardening Portland cement, or in order to maintain a substantially constant potential tricalcium aluminate content in the quick-hardening Portland cement.

It should be understood that the present process is not limited with respect to the proportion of ferruginous material which is added to normal Portland cement clinker except that the amount of $Fe_2O_3$ present after such addition should not be so great that there is not sufficient $Al_2O_3$ present to combine with all of the $Fe_2O_3$ to form the compound $4CaO.Al_2O_3.Fe_2O_3$. That is to say, the ratio of the percentage of $Fe_2O_3$ after such addition to the percentage of $Al_2O_3$ then present should not exceed the ratio of the molecular weight of $Fe_2O_3$ to the molecular weight of $Al_2O_3$, this ratio being approximately 1.57.

By means of the present process it is possible to manufacture normal Portland cement and an improved quick-hardening Portland cement simultaneously without the necessity of producing raw mixtures differing in composition, thus simplifying control of proportions of the raw materials which comprise all of the raw materials entering into the manufacture of the normal Portland cement clinker and which comprise all but a small percentage of the raw materials entering into the manufacture of quick-hardening Portland cement clinker by our process. Another advantage of the present process is that it makes it possible to control the iron oxide content or the tricalcium aluminate content of the quick-hardening cement independently of the control of $3CaO.SiO_2/2CaO.SiO_2$ ratio, which is controlled in the proportioning of the cement raw mix. Such independent control is favorable to the manufacture of a product of uniform quality.

During recent years it has become generally known that for certain uses, such as in concrete exposed to sulphate and alkali waters and other uses, Portland cements with a lower tricalcium aluminate content than the ordinary product are desirable. The present process makes it possible to manufacture a variety of quick hardening cements containing different percentages of tricalcium aluminate, as low as may be desired, without the necessity of making separate cement raw mixtures. The same ferruginous mixture may be used in each case, the different products being obtained by merely changing the amount of ferruginous mixture added to the normal Portland cement clinker.

We obtain a further benefit in that the Portland cement clinker which is re-calcined, is of such composition that it can be calcined to the extent that there is no substantial amount of free lime present, and that the ferruginous mixture is of such composition that it acts as a flux. The calcination of the clinker to which the ferruginous mixture is added is consequently accomplished readily, thereby reducing the time required for the process of calcination.

We claim:

1. The process that includes, producing Portland cement clinkers varying in potential composition but containing substantially the same ratio of potential tricalcium silicate to potential dicalcium silicate, adding thereto a ferruginous mixture consisting of ferruginous and calcareous materials in such proportions that the ratio of potential tricalcium silicate to potential dicalcium silicate in the final mixture is substantially the same as the said ratio in the Portland cement clinkers regardless of variations in the potential composition of the latter, and then grinding and calcining the final mixture to form a second Portland cement clinker having higher iron content than the first mentioned clinker but with substantially the same ratio of potential tricalcium silicate to potential dicalcium silicate.

2. The process that includes, producing Portland cement clinkers varying in potential composition but containing substantially the same ratio of potential tricalcium silicate to potential dicalcium silicate, grinding said clinker, then thoroughly mixing therewith a finely ground ferruginous mixture consisting of ferruginous and calcareous materials in such proportions that the ratio of potential tricalcium silicate to potential dicalcium silicate is substantially the same as the said ratio in the Portland cement clinkers regardless of variations in the potential composition of the latter, and then grinding and calcining the final mixture to form a second Portland cement clinker having higher iron content than the first mentioned clinker but with substantially the same ratio of potential tricalcium silicate to potential dicalcium silicate.

3. The process of simultaneously making Portland cements differing in iron oxide content but having substantially the same ratio of tricalcium silicate to dicalcium silicate in their respective potential compositions, that includes, making Portland cement clinkers varying in potential composition but containing substantially the same ratio of potential tricalcium silicate to potential dicalcium silicate, separating a portion of said Portland cement clinkers and adding to that portion a ferruginous mixture comprising calcareous and ferruginous materials in proportions calculated on the assumption that CaO, $Al_2O_3$ and $Fe_2O_3$ combine to form $3CaO.Al_2O_3$ and $CaO.Fe_2O_3$, and then grinding and calcining the combined clinker and ferruginous mixture to produce Portland cement clinker having higher iron content than the first mentioned clinker but in which the said ratio is substantially the same.

4. The process that includes, producing Portland cement clinkers varying in potential composition but containing substantially the same ratio of potential tricalcium silicate to potential dicalcium silicate, adding thereto a silica-containing ferruginous mixture having substantially the same ratio of potential tricalcium silicate to potential dicalcium silicate as the corresponding ratio in said Portland cement clinkers regardless of variations in the potential composition of the latter, and then grinding and calcining the final mixture to form a second Portland cement clinker having higher iron content.

5. The process that includes, producing Portland cement clinkers varying in potential composition but containing substantially the same ratio of potential tricalcium silicate to potential dicalcium silicate, adding thereto a ferruginous mixture composed of materials which when added to said Portland cement clinkers will maintain substantially the same said ratio of potential tricalcium silicate to potential dicalcium silicate regardless of variations in the potential composition of the latter, and then calcining the final mixture to form a second Portland cement clinker of higher iron content.

6. The process that includes, producing Portland cement clinkers varying in potential composition but containing substantially the same ratio of potential tricalcium silicate to potential dicalcium silicate, adding thereto a ferruginous mixture comprising calcareous and ferruginous materials in proportions calculated on the assumption that CaO, $Al_2O_3$ and $Fe_2O_3$ combine to form $3CaO.Al_2O_3$ and $CaO.Fe_2O_3$, and then calcining the final mixture to form a second Portland cement clinker of higher iron content.

7. The process of simultaneously making Portland cements differing in iron oxide content but having substantially the same ratio of tricalcium silicate to dicalcium silicate in their respective potential compositions, that includes, making Portland cement clinkers varying in potential composition but containing substantially the same ratio of potential tricalcium silicate to potential dicalcium silicate, separating a portion of said Portland cement clinkers and adding to that portion a ferruginous mixture in such quantity as to obtain a final mixture in which the iron content is higher than the iron content in said clinkers, said ferruginous mixture having a ratio of potential tricalcium silicate to potential dicalcium silicate substantially the same as the corresponding ratio in said clinkers regardless of variations in the potential composition of the clinker, and then grinding said final mixture and calcining it to produce Portland cement clinker having higher iron content than the first mentioned clinker but in which the said ratio is substantially the same.

8. The process that includes, producing Portland cement clinkers varying in potential composition but containing substantially the same ratio of potential tricalcium silicate to potential dicalcium silicate, adding thereto a ferruginous mixture comprising calcareous and ferruginous materials in proportions calculated on the assumption that CaO, $Al_2O_3$ and $Fe_2O_3$ combine to form $3CaO.Al_2O_3$ and $CaO.Fe_2O_3$, said proportions being such that any CaO in excess of that assumed to combine with the $Al_2O_3$ and $Fe_2O_3$ will combine with $SiO_2$ to form $3CaO.SiO_2$ and $2CaO.SiO_2$ in a predetermined ratio, and then calcining the final mixture to form a second Portland cement clinker of higher iron content.

LOUIS A. DAHL.
WILSON C. HANNA.